United States Patent
Wang et al.

(10) Patent No.: US 12,145,235 B2
(45) Date of Patent: Nov. 19, 2024

(54) ALTERNATING CURRENT POWER TOOL

(71) Applicant: Nanjing Chervon Industry Co., Ltd., Nanjing (CN)

(72) Inventors: Huaishu Wang, Nanjing (CN); Tianxiao Xu, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 0 days.

(21) Appl. No.: 17/841,370

(22) Filed: Jun. 15, 2022

(65) Prior Publication Data
US 2022/0305615 A1 Sep. 29, 2022

Related U.S. Application Data

(63) Continuation of application No. PCT/CN2020/131381, filed on Nov. 25, 2020.

(30) Foreign Application Priority Data

Dec. 31, 2019 (CN) .......................... 201911410514.3

(51) Int. Cl.
*H02P 6/08* (2016.01)
*B24B 23/02* (2006.01)
(Continued)

(52) U.S. Cl.
CPC ............ *B24B 47/12* (2013.01); *B24B 23/028* (2013.01); *H02K 7/145* (2013.01); *H02P 6/08* (2013.01); *H02P 27/06* (2013.01)

(58) Field of Classification Search
CPC ..... B24B 47/12; B24B 23/028; B24B 55/052; H02P 6/085; H02P 6/08; H02P 27/06; H02K 7/145
See application file for complete search history.

(56) References Cited

U.S. PATENT DOCUMENTS

| 6,441,572 B2 * | 8/2002 | Batzel | H02P 6/22 |
| | | | 318/400.12 |
| 9,621,081 B2 * | 4/2017 | Kawai | H02P 6/157 |
| 11,211,894 B2 * | 12/2021 | Kumakura | B25F 5/00 |

(Continued)

FOREIGN PATENT DOCUMENTS

| CN | 101694969 A | 4/2010 |
| CN | 101860190 A * | 10/2010 |

(Continued)

OTHER PUBLICATIONS

ISA/CN, Translation of Int. Search Report issued on PCT application No. PCT/CN2020/131381, dated Feb. 25, 2021, 3 pages.

(Continued)

*Primary Examiner* — Thai T Dinh
(74) *Attorney, Agent, or Firm* — Greenberg Traurig, LLP (57) ABSTRACT

An alternating current power tool includes a function element, a brushless motor, and a motor control circuit. The motor control circuit includes a power module, a first rectifier circuit, a driver circuit, a controller, and a second rectifier circuit. The power module is used for receiving an alternating current. The first rectifier circuit is used for receiving the alternating current received by the power module and operatively outputting a direct current bus voltage. The second rectifier circuit is electrically connected to the power module and used for receiving the alternating current received and outputting a direct current to supply power to at least the controller.

6 Claims, 5 Drawing Sheets

(51) Int. Cl.
*B24B 47/12* (2006.01)
*H02K 7/14* (2006.01)
*H02P 27/06* (2006.01)

(56) References Cited

U.S. PATENT DOCUMENTS

| | | |
|---|---|---|
| 2011/0234140 A1 | 9/2011 | Kuroda |
| 2014/0035492 A1 | 2/2014 | Sayed et al. |
| 2015/0256111 A1* | 9/2015 | Forster ................. H02P 6/14 318/400.27 |
| 2016/0190960 A1* | 6/2016 | Kawai ................. H02P 27/08 318/400.03 |
| 2016/0197573 A1* | 7/2016 | Iwata ................. H02K 19/10 318/400.26 |
| 2017/0155347 A1* | 6/2017 | Park ................. H02P 27/08 |
| 2018/0099372 A1* | 4/2018 | Takeda ................. B25F 5/008 |
| 2018/0278192 A1 | 9/2018 | Simms et al. |
| 2020/0259429 A1* | 8/2020 | Yoshinari ................. B24B 55/00 |

FOREIGN PATENT DOCUMENTS

| | | | |
|---|---|---|---|
| CN | 201830193 U | 5/2011 | |
| CN | 205490201 U | 8/2016 | |
| CN | 106602897 A | 4/2017 | |
| CN | 108233785 A | 6/2018 | |
| CN | 208479171 U | 2/2019 | |
| EP | 3663050 A1 * | 6/2020 | ............. B24B 23/02 |

OTHER PUBLICATIONS

ISA/CN, Int. Search Report issued on PCT application No. PCT/CN2020/131381, dated Feb. 25, 2021, 5 pages.

ISA/CN, Written Opinion issued on PCT application No. PCT/CN2020/131381, dated Feb. 25, 2021, 3 pages.

ISA/CN, Translation of Written Opinion issued on PCT application No. PCT/CN2020/131381, dated Sep. 10, 2020, 3 pages.

* cited by examiner

ALTERNATING CURRENT POWER TOOL

RELATED APPLICATION INFORMATION

The present disclosure is a continuation of International Application No. PCT/CN2020/131381, filed on Nov. 25, 2020, claiming the benefit of Chinese Patent Application No. 201911410514.3 filed on Dec. 31, 2019, the disclosures of which are incorporated herein by reference in their entirety.

BACKGROUND

At present, for a high voltage brushless product, an input power is an alternating current that cannot be directly used for driving a motor. Therefore, it is necessary to rectify an alternating current into a direct current. However, since a motor is an inductive load, when the motor is controlled in a modulation process or a commutation process, a voltage after rectification is not stable due to a freewheeling current. A voltage may be pulled down when a current is large, and a voltage may be raised when there is a freewheeling current. As a result, an electronic device is damaged due to the unstable power supply of the weak current part of a printed circuit board assembly (PCBA), and the voltage on a bus cannot actually reflect an input voltage.

In the related art, a set of rectifier circuit is usually used in an alternating current power tool to rectify a motor control system. The current of a weak current part is still unstable. A voltage is too high, and the electronic device of a control circuit is easily damaged. A bus voltage cannot be actually reflected, and the bus voltage cannot be detected in real time to enter under-voltage protection. As a result, an electric motor is damaged. Therefore, a suitable circuit scheme is required to ensure that the weak current part can supply power stably.

SUMMARY

An alternating current power tool includes a function element, a brushless motor and a motor control circuit. The function element is used for performing the function of the power tool. The brushless motor is used for driving the function element. The brushless motor includes a stator winding and a rotor. The motor control circuit includes a power module, a first rectifier circuit, a driver circuit, a controller and a second rectifier circuit. The power module is used for receiving an alternating current to supply power to the stator winding. The first rectifier circuit is connected to the power module and used for receiving the alternating current received by the power module and operatively outputting a direct current bus voltage. The driver circuit is electrically connected to the first rectifier circuit and the brushless motor separately and used for driving the brushless motor. The controller is configured to control the driver circuit to drive the brushless motor to operate. The second rectifier circuit is electrically connected to the power module and used for receiving the alternating current received by the power module and outputting a direct current to supply power to at least the controller.

In one example, the motor control circuit further includes a voltage detection module. The voltage detection module is electrically connected to the brushless motor and used for detecting the phase voltage of the brushless motor. The controller is electrically connected to the voltage detection module and used for computing a rotor position according to the phase voltage to control the driver circuit to drive the brushless motor to operate.

In one example, the motor control circuit further includes a power sub-module. The power sub-module is electrically connected to the second rectifier circuit and the controller separately to convert the direct current voltage output by the second rectifier circuit into a power supply voltage adapted to the controller and output the power supply voltage.

In one example, the motor control circuit further includes an input voltage detection module. The input voltage detection module is connected to the second rectifier circuit and used for acquiring the direct current voltage output by the second rectifier circuit and sending the direct current voltage to the controller.

In one example, when the direct current voltage output by the second rectifier circuit is lower than a preset voltage, the controller stops driving the brushless motor.

In one example, the range of the preset voltage is 220 V to 230 V.

In one example, the second rectifier circuit includes a second rectifier unit, a second filter unit, a voltage regulator and a voltage converter. The second rectifier unit is used for converting the alternating current input by the power module into the direct current. The second filter unit is connected to the second rectifier unit to filter the direct current output by the second rectifier unit.

The voltage converter is connected to the second filter unit to step down a direct current. The voltage regulator is connected to the voltage converter and used for regulating the direct current output by the voltage converter.

In one example, the voltage converter includes a low-dropout linear regulator or a direct current/direct current converter.

In one example, the first rectifier circuit includes a first rectifier circuit and a first filter unit. The first rectifier circuit is used for converting the alternating current received by the power module into a direct current. The first filter unit is connected to the first rectifier circuit to filter the direct current output by the first rectifier circuit.

In one example, the first filter unit is a thin-film capacitor.

DETAILED DESCRIPTION

The present application is further described in detail hereinafter in conjunction with the drawings and examples. It is to be understood that the examples described herein are intended to illustrate and not to limit the present application. In addition, it is to be noted that to facilitate description, only part, not all, of structures related to the present application are illustrated in the drawings.

Figure 1:
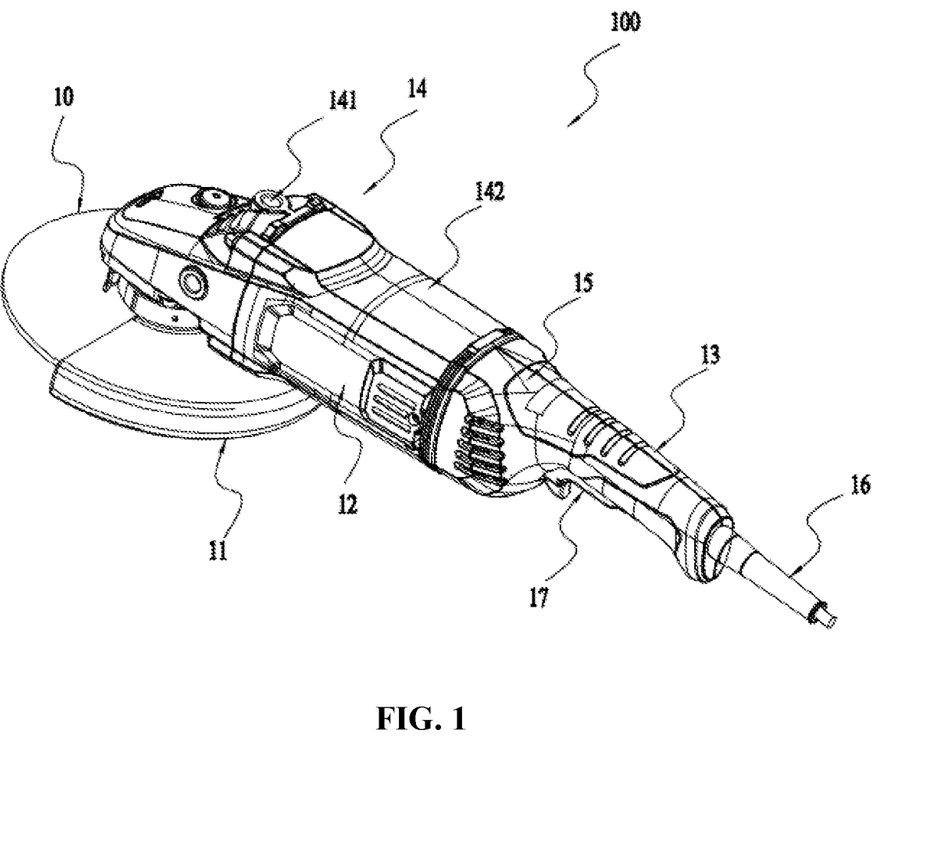
FIG. 1 is a view illustrating the structure of an angle grinder of an alternating current power tool according to example one of the present application.

FIG. 1 is a view illustrating the structure of an angle grinder of an alternating current power tool according to example one of the present application. As shown in FIG. 1, the angle grinder 100 includes a function element 10, a shield 11, an output shaft (not shown), a motor 12, a handle 13, a transmission mechanism (not shown), a housing 14, a braking device 15 and an alternating current unit 16.

The function element 10 is used for performing the function of the power tool. In an electric drill, the function element is a drill bit. In this example, the function element 10 is a grinding disc for performing a grinding or cut function. At least part of the shield 11 covers the function element 10 to achieve a protection function. The output shaft is used for mounting or securing the function element 10. The motor 12 is used for driving the output shaft to rotate. Specifically, the motor 12 includes a motor shaft. The output shaft and the motor shaft are connected through the transmission mechanism to transmit the drive force of the motor shaft to the output shaft. The housing 14 is used for mounting or securing the motor 12. The handle 13 is configured for the user to grip. The handle 13 may be used as an independent component or formed by the housing 14. The housing 14 includes a head housing 141 and a motor housing 142. The motor 12 is secured to the housing 142. The head housing 141 is used for mounting the transmission mechanism. The braking device 15 is disposed between the handle 13 and the motor 12 and can quickly brake the motor shaft. When the user needs to stop the rotation of the function element 10, the braking device 15 stops the motor 12 in a short time to avoid danger. Although this example relates to the angle grinder 100, it is to be understood that the present application is not limited to the disclosed example and is applicable to another type of power tool. For example, another type of power tool may be another alternating current power tool such as a sander, an electric drill and an electric wrench.

The alternating current unit 16 is used for receiving an alternating current to supply power to the angle grinder 100. In some examples, the alternating current unit 16 includes an alternating current plug and a peripheral circuit electrically connected to the alternating current plug. The alternating current plug is plugged into an alternating current socket to receive alternating current mains, thereby providing an electric energy source for the power tool. In another example, the alternating current unit 16 includes structures in other forms and peripheral circuits capable of receiving an alternating current. For example, an alternating current plug receives an alternating current by plugging into a portable substation. It is to be noted that the alternating current unit 16 only needs to be able to receive an alternating current, and the specific structure and form are not limited in the present application. The value range of the alternating current that the alternating current unit 16 can receive is 110 V to 130 V or 210 V to 230 V.

Figure 2:
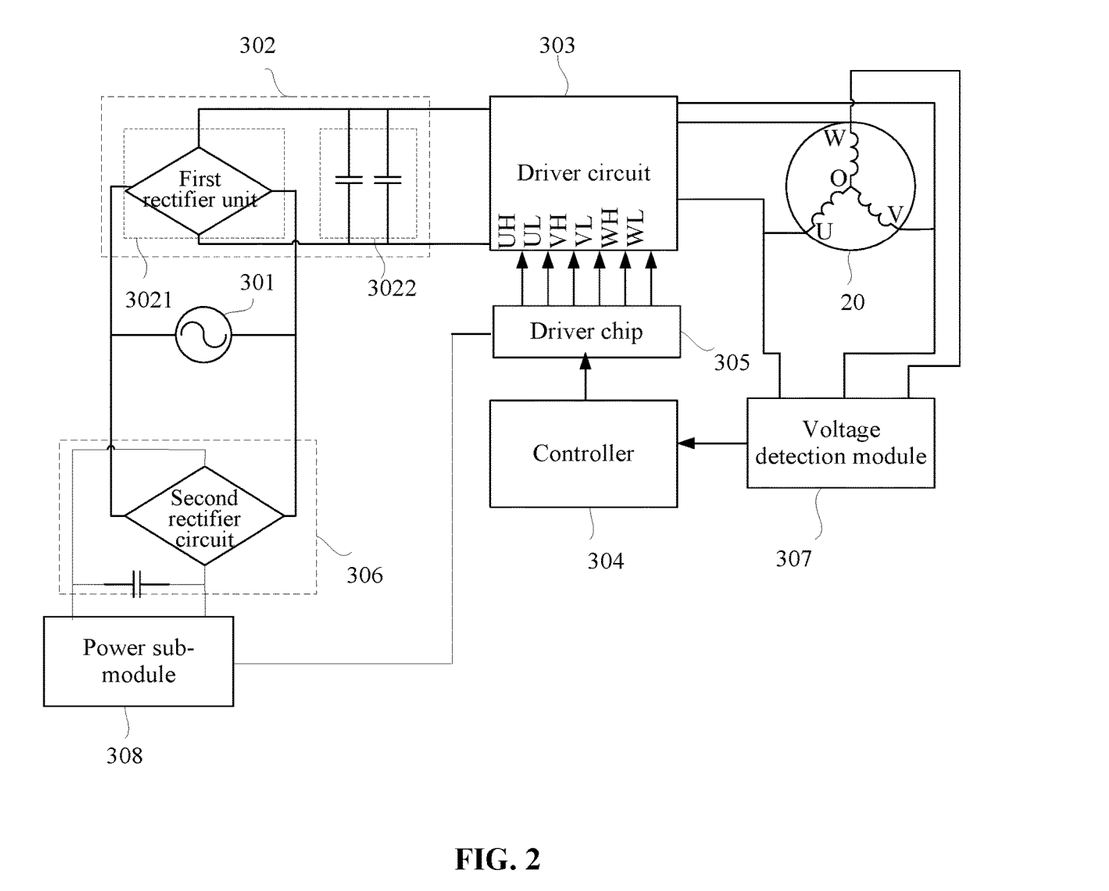
FIG. 2 is a block diagram of a motor control circuit according to example one of the present application.

The angle grinder 100 further includes an operation switch 17 for turning the motor 12 on or off. When the operation switch 17 is triggered, the motor 12 is turned on. When the operation switch 17 is released, the motor 12 is turned off. The operation switch 17 is disposed on the handle 13. FIG. 2 is a block diagram of a motor control circuit according to example one of the present application. In this example of the present application, the alternating current power tool includes a brushless motor 20 for driving the function element. The brushless motor includes a stator winding and a rotor. This power tool further includes a motor control circuit. The motor control circuit includes a power module 301, a first rectifier circuit 302, a driver circuit 303, a controller 304 and a second rectifier circuit 306. The power module 301 is used for receiving an alternating current to supply power to the stator winding. The first rectifier circuit 302 is connected to the power module 301 and used for receiving the alternating current received by the power module 301 and operatively outputting a direct current bus voltage. The driver circuit 303 is electrically connected to the first rectifier circuit 302 and the brushless motor 20 separately and used for driving the brushless motor 20. The controller 304 is electrically connected to the driver circuit 303 and configured to control the driver circuit 303 to drive the brushless motor 20 to operate. The second rectifier circuit 306 is electrically connected to the power module 301 and used for receiving the alternating current received by the power module 301 and outputting a direct current to supply power to the controller 304. A voltage detection module 307 is electrically connected to the brushless motor 20 and used for detecting the phase voltage of the brushless motor 20. The controller 304 is electrically connected to the voltage detection module 307 and used for computing a rotor position according to the phase voltage to control the driver circuit 303 to drive the brushless motor 20 to operate. A power sub-module 308 is electrically connected to the second rectifier circuit 306 and the controller 304 separately and used for supplying power to the controller 304.

The brushless motor 20 may be a three-phase brushless motor and includes a rotor having a permanent magnet and three-phase stator windings U, V and W commutated electronically. For example, a star connection (as shown in FIG. 2) or an angle connection is adopted between the three-phase stator windings U, V and W. The connection mode of the three-phase stator windings of the motor is not limited in this example.

Referring to FIG. 2, the motor control circuit 30 includes a power module 301 for receiving the alternating current to supply power to the stator winding. In some examples, the power module 301 includes an alternating current plug and a peripheral circuit electrically connected to the alternating current plug. The alternating current plug is plugged into an alternating current socket to receive alternating current mains, thereby providing an electric energy source for the brushless motor 20.

The power module 301 is connected to the first rectifier circuit 302. The power module 301 is connected to the second rectifier circuit 306. The first rectifier circuit 302 and the second rectifier circuit 306 are used for converting the alternating current received by the power module 301 into the direct current.

Referring to FIG. 2, the motor control circuit further includes a driver chip 305. The driver circuit 303 is electrically connected to the first rectifier circuit 302 to output a direct current. The controller 304 is configured to control the driver circuit 303 to drive the brushless motor 20 to operate. The driver chip 305 is used for controlling the on or off state of an electronic switch of the driver circuit 304. The driver chip 305 is in series connection between the controller 304 and the driver circuit 303 and, according to a control signal from the controller 304, controls the on or off state of the electronic switch of the driver circuit 303. In this example, it is shown that the driver chip 305 is separated from the controller 304. In other examples, the driver chip 305 and the controller 304 may be integrated into one unit.

Figure 3:
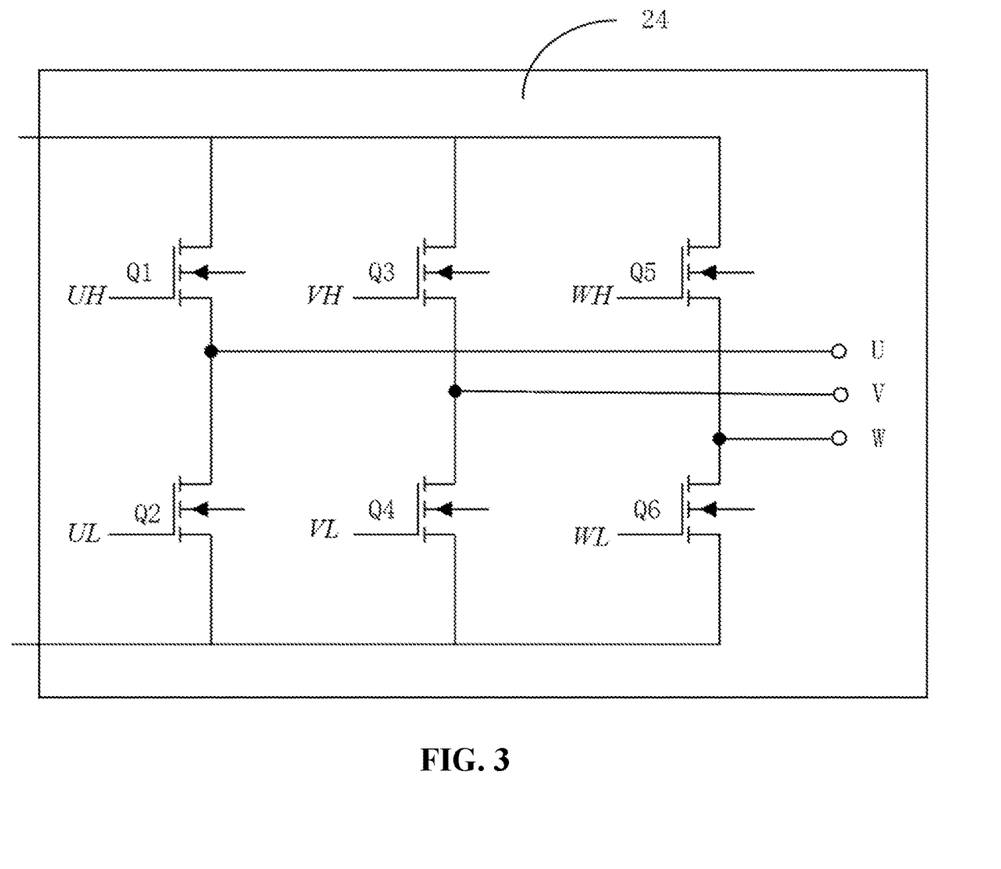
FIG. 3 is a diagram illustrating the internal structure of a driver circuit according to example one of the present application.

The driver circuit 303 is used for driving the brushless motor 20. Under the drive of the drive signal output by the driver chip 305, the power of a direct-current pulsating voltage is distributed to each phase winding on the stator of the motor in a certain logical relationship to start the motor and to make the motor generate continuous torque. FIG. 3 is a diagram illustrating the internal structure of a driver circuit according to example one of the present application. The driver circuit 303 includes multiple electronic switches. In some examples, an electronic switch includes a field effect transistor (FET). In other examples, an electronic switch includes an insulated-gate bipolar transistor (IGBT). Referring to FIG. 3, in some examples, the driver circuit 303 is a three-phase bridge circuit. The driver circuit 303 includes three driver switches Q1, Q3 and Q5 configured as high-side switches and three driver switches Q2, Q4 and Q6 configured as low-side switches.

The three driver switches Q1, Q3 and Q5 as the high-side switches are disposed between a power supply line and phase coils of the motor respectively. Three switch elements Q2, Q4 and Q6 as low-side switches are disposed between phase coils of the motor and a ground wire respectively.

Each gate terminal UH, UL, VH, VL, WH and WL of six driver switches Q1 to Q6 is electrically connected to the controller 27, and each drain or source of the six driver switches is connected to the stator winding of the motor. The driver switches Q1 to Q6 switch on and off at a certain frequency according to the control signal output by the controller 304 to change the power state loaded by the power module 301 on the winding of the brushless motor 20.

The driver chip 305 is used for controlling the on or off state of the electronic switch of the driver circuit 303. The driver chip 305 is in series connection between the controller 304 and the driver circuit 303 and, according to the control signal from the controller 304, controls the on or off state of the electronic switch of the driver circuit 304. It is to be understood that in this example, it is shown that the driver chip 52 is separated from the controller 51. In other examples, the driver chip 52 and the controller 51 may be integrated into one unit.

It is to be noted that the driver circuit 303 is a circuit for driving the motor to rotate by switching the power-on state of each phase winding of the motor and controlling the power-on current of each phase winding. The on sequence and time of each phase winding depends on the position of the rotor. To make the brushless motor 20 rotate, the driver circuit 303 has multiple drive states. In a drive state, the stator winding of the motor may generate a magnetic field, and the controller 304 outputs a control signal based on different rotor positions to control the driver circuit 303 to switch a drive state. In this manner, the magnetic field generated by the stator winding rotates to drive the rotor to rotate and thereby drives the brushless motor 20.

The voltage detection module 307 is used for detecting the phase voltage of the brushless motor 20 and sending the phase voltage to the controller 304. The controller 304 computes the position of the rotor, and the controller 304 outputs a control signal based on different rotor positions to control the driver circuit 303 to switch a drive state. In this manner, the magnetic field generated by the stator winding rotates to drive the rotor to rotate and thereby drives the brushless motor 20.

The voltage detection module 307 is a voltage sensor. In other examples, the voltage detection module 307 includes a voltage detection circuit of a voltage divider resistor. The motor control circuit further includes a current detection module (not shown) for detecting a current loaded on the stator winding.

It is to be noted that the rotor position is configured that the rotor position of the brushless motor 20 is estimated according to at least the phase voltage of the brushless motor 20 and the current of the stator winding. For example, the inductance value of the stator winding is estimated according to the phase voltage of the brushless motor 20 and the current of the stator winding, and a one-to-one matching relationship between the inductance value and the rotor position is established. Thus, the rotor position is acquired.

The power sub-module 308 is used for supplying power to the driver chip 305 and the controller 304. The power sub-module 308 is connected to the second rectifier circuit 306. The voltage output by the second rectifier circuit 306 is reduced to a voltage adapted to the operation of the controller 304 and the driver chip 305. For example, the voltage output by the second rectifier circuit 306 is 220 V, and the voltage output by the power sub-module 308 is 15 V that is adapted to the operation of the controller 304 and the driver chip 305.

In the related art, the power module 301 supplies power to the motor of a strong current part and to the controller 304 and driver chip 305 of a weak current part simultaneously through the first rectifier circuit 302, and when the motor is controlled in a modulation process or a commutation process, there is a freewheeling current in the brushless motor. As a result, the voltage after passing through the first rectifier circuit 302 is unstable, and the weak current part is also unstable. In this solution, the power module 301 is connected to the second rectifier circuit 306, and the power sub-module 308 supplies power to the controller 304 and the driver chip 305. In this manner, the weak current part is not influenced by the fluctuation of a bus voltage so that the weak current part is not affected by bus voltage fluctuations and thus can supply power stably, thereby effectively preventing the mutual interference between a strong current and a weak current in the motor control circuit.

Figure 4:
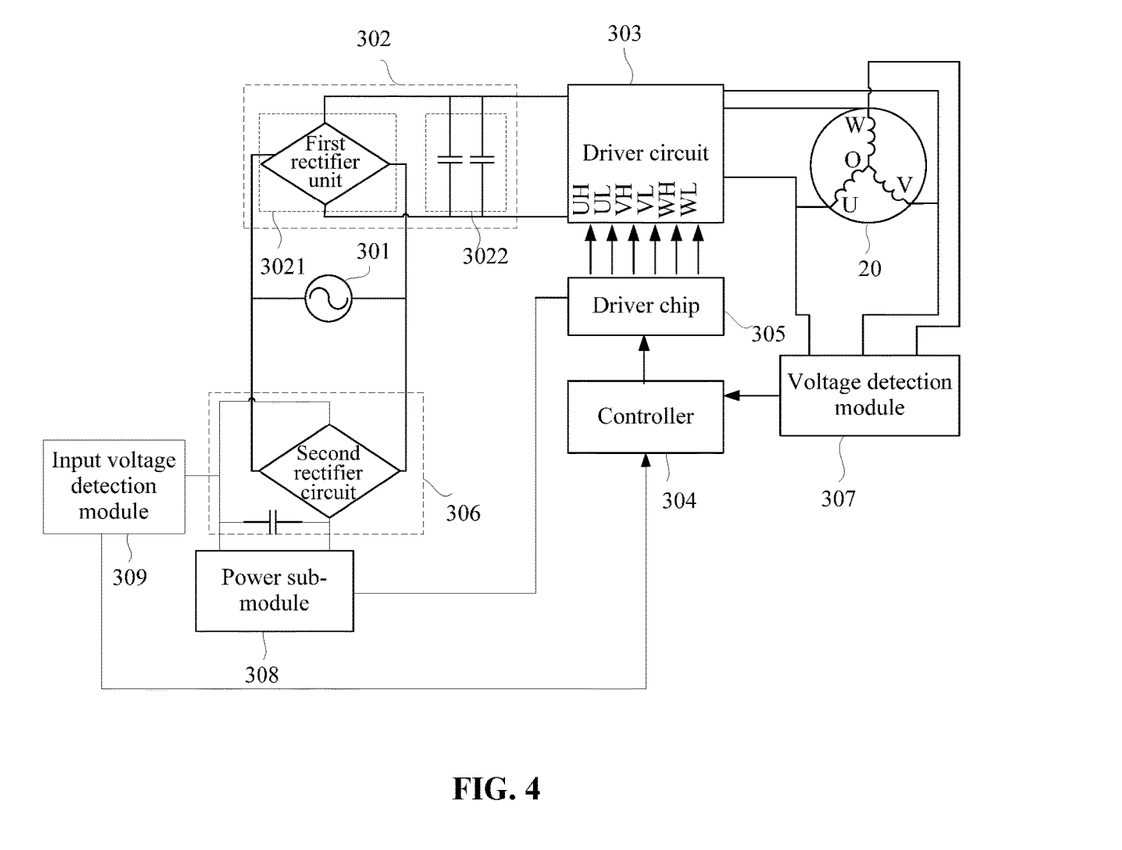
FIG. 4 is a block diagram of a motor control circuit according to example two of the present application.

FIG. 4 is a block diagram of a motor control circuit according to example two of the present application. This example is an optimization on the basis of the preceding example. Optionally, this motor control circuit further includes an input voltage detection module 309. The input voltage detection module 309 is connected to the second rectifier circuit 306 and used for acquiring the direct current voltage output by the second rectifier circuit 306 and sending the direct current voltage to the controller 304.

Optionally, when the direct current voltage output by the second rectifier circuit 306 is lower than a preset voltage, the controller 304 stops driving the brushless motor 20.

Optionally, the range of the preset voltage is 210 V to 230 V.

The input voltage detection module 309 acquires the direct current voltage output by the second rectifier circuit 306 and sends the direct current voltage to the controller 304. The controller 304 determines whether the input direct current voltage is a safety voltage. If the input direct current voltage is the safety voltage, the controller 304 controls the driver circuit 303 to drive the motor 20 to operate according to the output direct current voltage. If the controller 304 determines that the output direct current voltage is not the safety voltage, the brushless motor 20 enters an undervoltage protection state to ensure that the modules in the whole motor control circuit are not burnt out.

Figure 5:
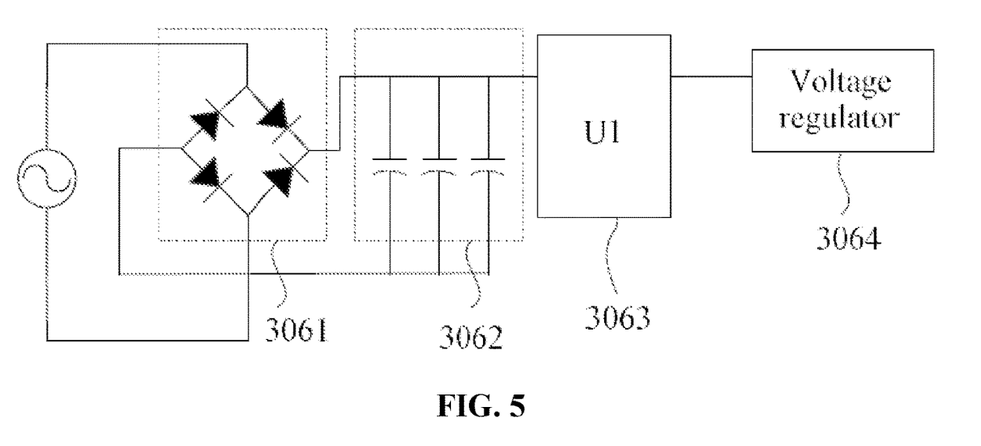
FIG. 5 is a block diagram of a second rectifier circuit and a power sub-module according to example two of the present application.

Optionally, FIG. 5 is a circuit block diagram of a second rectifier circuit and a power sub-module according to the example two. As shown in FIG. 5, the second rectifier circuit 306 includes a second rectifier unit 3061 and a second filter unit 3062, and the power sub-module 308 includes a voltage converter 3063 and a voltage regulator 3064. The second rectifier unit 3061 is used for converting the alternating current input by the power module 301 into the direct current. The second filter unit 3062 is connected to the second rectifier unit 3061 to filter the direct current output by the second rectifier unit 3061. The voltage converter 3063 is used for stepping down the direct current output by the second filter unit 3062. The voltage regulator 3064 is connected to the voltage converter 3063 and used for regulating the direct current output by the voltage converter 3063.

The configuration in which the second rectifier circuit 306 is connected to the power module 301, and the power sub-module 308 supplies power to the controller 304 and the driver chip 305 solves the problem that in the related art, the case where the power module 301 supplies power to the motor of the strong current part and to the controller 304 and driver chip 305 of the weak current part simultaneously through the first rectifier circuit 302, and when the motor is controlled in the modulation process or the commutation process, there is a freewheeling current in the brushless motor causes the voltage after passing through the first rectifier circuit to be unstable and causes the weak current part to be also unstable.

The second rectifier unit 3061 includes a rectifier bridge. The second filter unit 3062 may be a capacitor connected in parallel to two ends of the rectifier bridge. The voltage converter 3064 includes a low-dropout (LDO) linear regulator or a direct current (DC)/direct current (DC) converter.

Optionally, referring to FIG. 4, the first rectifier circuit 302 includes a first rectifier unit 3021 and a first filter unit 3022. The first rectifier unit 3021 is used for converting the alternating current received by the power module 301 into the direct current. The first filter unit 3022 is connected to the first rectifier unit 3021 to filter the direct current output by the first rectifier unit 3021.

For example, the first rectifier circuit 302 may be a small rectifier bridge that converts the received alternating current into the direct current. The first filter unit 3021 may include multiple capacitors connected in parallel.

Optionally, the first filter unit 3022 is a thin-film capacitor.

A filter capacitor is used for filtering a pulsating direct current from a rectifier circuit. In some examples, the filter capacitor is a small electrolytic capacitor. In other examples, the filter capacitor is a thin-film capacitor. The value range of the capacitance value C of the filter capacitor is $1.46Y$ $\mu F \leq C \leq 6Y$ $\mu F$. Y denotes the rated current of the alternating current power tool, and the unit is A. The thin-film capacitor can withstand a high voltage and is not easily damaged by the high voltage. Thus, the service life of the power tool is ensured.

In the examples of the present application, the alternating current power tool includes a function element 10, a brushless motor 20 and a motor control circuit 30. The motor control circuit includes a power module 301, a first rectifier circuit 302, a second rectifier circuit 306, a driver circuit 303, a driver chip 305 and a controller 304. The function element 10 is used for performing the function of the power tool. The brushless motor 20 is used for driving the function element. The brushless motor includes a stator winding and a rotor. The power module 301 is used for receiving an alternating current to supply power to the stator winding. The first rectifier circuit 302 is used for receiving the alternating current received by the power module 301 and operatively outputting a direct current bus voltage. The driver circuit 303 is electrically connected to the first rectifier circuit 302 and the brushless motor 20 separately and used for driving the brushless motor 20. The controller 304 is electrically connected to the driver chip 305. The driver chip 305 is electrically connected to the driver circuit 303. The controller 304 is configured to control the driver circuit 303 to drive the brushless motor 20 to operate through the driver chip 305. The second rectifier circuit 306 is electrically connected to the power module 301 and used for receiving the alternating current received by the power module 301 and outputting a direct current to supply power to the controller 304 and the driver chip 305. In this solution, the power module 301 is also connected to the second rectifier circuit 306. In this manner, the weak current part is not influenced by the fluctuation of the bus voltage so that the weak current part is not affected by bus voltage fluctuations and thus can supply power stably, thereby effectively preventing the mutual interference between the strong current and the weak current in the motor control circuit. The input voltage detection module 309 is connected to the second rectifier circuit 306. The controller 304 determines whether the output direct current voltage is a safety voltage and then drives the brushless motor to operate according to the output direct current voltage through the driver circuit. Thus, the under-voltage protection for the motor is achieved.

In this solution, the configuration in which the power module is also connected to the second rectifier circuit solves the problem that in the related art, the case where the power module supplies power to the brushless motor of a strong current part and to the controller and driver chip of a weak current part simultaneously through the first rectifier circuit, and when the brushless motor is controlled in a modulation process or a commutation process, there is a freewheeling current in the brushless motor causes the voltage after passing through the first rectifier circuit to be unstable and causes the weak current part to be also unstable. The power module is also connected to the second rectifier circuit to make the weak current part not influenced by the fluctuation of a bus voltage so that the weak current part is not affected by bus voltage fluctuations and thus can supply power stably, thereby effectively preventing the mutual interference between a strong current and a weak current in the motor control circuit.

What is claimed is:
1. An alternating current power tool, comprising:
a function element for performing a function of the alternating current power tool;
a brushless motor for driving the function element, wherein the brushless motor comprises a stator winding and a rotor; and
a motor control circuit comprising:
a power module for receiving an alternating current to supply power to the stator winding;
a first rectifier circuit connected to the power module and used for receiving the alternating current received by the power module and operatively outputting a direct current bus voltage;
a driver circuit electrically connected to the first rectifier circuit and the brushless motor separately and used for driving the brushless motor;
a controller configured to control the driver circuit to drive the brushless motor to operate; and
a second rectifier circuit electrically connected to the power module and used for receiving the alternating current received by the power module and outputting a direct current to supply power to at least the controller,
wherein the first rectifier circuit comprises a first rectifier unit and a first filter unit, the first rectifier unit is coupled to the power module and used for converting the alternating current received by the power module into the direct current, and the first filter unit is connected to the first rectifier unit to filter the direct current output by the first rectifier unit,
wherein the first filter unit is a thin-film capacitor, and further comprising an input voltage detection module connected to the second rectifier circuit and used for acquiring a direct current voltage output by the second rectifier circuit and sending the direct current voltage output to the controller, wherein, when the direct current voltage output by the second rectifier circuit is lower than a preset voltage, the controller stops driving the brushless motor.

2. The alternating current power tool according to claim 1, further comprising:
a voltage detection module electrically connected to the brushless motor and used for detecting a phase voltage of the brushless motor;
wherein the controller is electrically connected to the voltage detection module and used for computing a rotor position according to the phase voltage to control the driver circuit to drive the brushless motor to operate.

3. The alternating current power tool according to claim 1, further comprising:
a power sub-module electrically connected to the second rectifier circuit and the controller separately to convert a direct current voltage output by the second rectifier circuit into a power supply voltage adapted to the controller and output the power supply voltage.

4. The alternating current power tool according to claim 1, wherein a range of the preset voltage is 210 V to 230 V.

5. The alternating current power tool according to claim 1, wherein the second rectifier circuit comprises a second rectifier unit and a second filter unit, the alternating current power tool further comprises a voltage converter and a voltage regulator, the second rectifier unit is used for converting the alternating current received by the power module into the direct current, the second filter unit is connected to the second rectifier unit to filter the direct current output by the second rectifier unit, the voltage converter is connected to the second filter unit to step down a direct current, and the voltage regulator is connected to the voltage converter and used for regulating a direct current output by the voltage converter.

6. The alternating current power tool according to claim 5, wherein the voltage regulator comprises a low-dropout (LDO) linear regulator or a direct current/direct current converter.

* * * * *